United States Patent
He et al.

(10) Patent No.: US 12,267,303 B2
(45) Date of Patent: Apr. 1, 2025

(54) INPUT/OUTPUT SYSTEM APPLIED TO NETWORK SECURITY DEFENSE SYSTEM

(71) Applicants: CHINA NATIONAL DIGITAL SWITCHING SYSTEM ENGINEERING & TECHNOLOGICAL R&D CENTER, Zhengzhou (CN); PURPLE MOUNTAIN LABORATORIES, Nanjing (CN)

(72) Inventors: Lei He, Zhengzhou (CN); Jiangxing Wu, Zhengzhou (CN); Qinrang Liu, Zhengzhou (CN); Ke Song, Zhengzhou (CN); Shuai Wei, Zhengzhou (CN); Jianliang Shen, Zhengzhou (CN); Libo Tan, Zhengzhou (CN); Yu Li, Zhengzhou (CN); Quan Ren, Zhengzhou (CN); Jun Zhou, Zhengzhou (CN); Min Fu, Zhengzhou (CN); Weili Zhang, Zhengzhou (CN); Ruihao Ding, Zhengzhou (CN); Yiwei Guo, Zhuhai (CN)

(73) Assignees: CHINA NATIONAL DIGITAL SWITCHING SYSTEM ENGINEERING & TECHNOLOGICAL R&D CENTER, Zhengzhou (CN); PURPLE MOUNTAIN LABORATORIES, Nanjing (CN)

( * ) Notice: Subject to any disclaimer, the term of this patent is extended or adjusted under 35 U.S.C. 154(b) by 237 days.

(21) Appl. No.: 17/789,082

(22) PCT Filed: Jun. 7, 2021

(86) PCT No.: PCT/CN2021/098596
§ 371 (c)(1),
(2) Date: Jun. 24, 2022

(87) PCT Pub. No.: WO2021/249335
PCT Pub. Date: Dec. 16, 2021

(65) Prior Publication Data
US 2023/0039521 A1      Feb. 9, 2023

(30) Foreign Application Priority Data
Jun. 9, 2020   (CN) .......................... 202010519102.X

(51) Int. Cl.
*H04L 9/40*   (2022.01)
*H04L 1/00*   (2006.01)

(52) U.S. Cl.
CPC ........ *H04L 63/0281* (2013.01); *H04L 1/0061* (2013.01)

(58) Field of Classification Search
CPC .......................... H04L 1/0061; H04L 63/0281
(Continued)

(56) References Cited

U.S. PATENT DOCUMENTS

| | | | | |
|---|---|---|---|---|
| 2010/0040272 A1* | 2/2010 | Zheng | ................. | G06V 10/751 600/410 |
| 2012/0124393 A1* | 5/2012 | Sethumadhavan | ..... | H04L 9/008 726/36 |

(Continued)

FOREIGN PATENT DOCUMENTS

| | | | | |
|---|---|---|---|---|
| CN | 107346272 A | * | 11/2017 | .......... G06F 11/1443 |
| CN | 108134740 A | | 6/2018 | |

(Continued)

OTHER PUBLICATIONS

English translation of CN-107346272-A, Clarivate Analytics, 2017, pp. 1-20 (Year: 2017).*

(Continued)

*Primary Examiner* — David P Zarka

(74) *Attorney, Agent, or Firm* — Schwabe, Williamson & Wyatt, P.C.

(57) ABSTRACT

A structural encoding unit and an error correction decoding unit are divided. The structure encoding unit is divided into input branch processor and an input proxy processor; and the error correction decoding unit is divided into an output routing processor, an output proxy processor, an adjudication branch processor, an adjudication proxy processor and a voting processor. The input branch processor is used for duplicating and distributing messages, the arbitration branch processor is used for duplicating and distributing data, the voting processor is used for performing voting, and the output routing processor is used for selecting an output result from processing results of the output proxy processor according to a voting result of the voting processor.

8 Claims, 4 Drawing Sheets

(58) Field of Classification Search
USPC .......................................................... 726/12
See application file for complete search history.

(56) References Cited

U.S. PATENT DOCUMENTS

| | | | |
|---|---|---|---|
| 2014/0287685 A1* | 9/2014 | Griffin | H04L 63/0272 455/41.2 |
| 2015/0131396 A1* | 5/2015 | Sosogi | G11C 5/148 365/227 |
| 2017/0102943 A1 | 4/2017 | Voellmy | |
| 2018/0234585 A1* | 8/2018 | Yano | G06F 21/34 |
| 2019/0081639 A1* | 3/2019 | Hanham | H03M 13/1108 |
| 2020/0026965 A1* | 1/2020 | Guo | G06N 3/08 |
| 2021/0342420 A1* | 11/2021 | Doré | G06F 21/54 |

FOREIGN PATENT DOCUMENTS

| | | | | |
|---|---|---|---|---|
| CN | 109525594 A | 3/2019 | | |
| CN | 110177084 A | 8/2019 | | |
| CN | 110381008 A | 10/2019 | | |
| CN | 106790085 B | * 10/2020 | ........... | G06F 21/577 |
| CN | 112217604 A | 1/2021 | | |
| EP | 1059578 A2 | 12/2000 | | |

OTHER PUBLICATIONS

English translation of CN-106790085-B, Clarivate Analytics, 2020, pp. 1-16 (Year: 2020).*
Saberi et al., State Estimation via Worst-Case Erasure and Symmetric Channels with Memory, 2019 IEEE International Symposium on Information Theory (ISIT), pp. 3072-3076 (Jul. 2019) (Year: 2019).*
Wu, et al., "A Mimic Arbitration Optimization Method Based on Heterogeneous Degree of Executors" Computer Engineering, 2020, vol. 46, No. 5; pp. 12-18.
Ma Hailong et al., "Dynamic Heterogeneous Redundancy Based Router Architecture with Mimic Defenses" Journal of Cyber Security Jan. 2017, vol. 2, No. 1; 14 pages.
International Search Report and Written Opinion for PCT/CN2021/098596, dated Aug. 24, 2021; 9 pages, including English Translation of Search Report.
Song, et al. "An Equivalent Scheduling Strategy for Cyberspace Mimicry Defense Based on Security Priority" Procedings of the 2018 International Conference on Advanced Mechatronic Systems, Zhengzhou, China, Aug. 30-Sep. 2, 2018; pp. 52-57.
Kingming, et al., "Markov game modeling of mimic defense and defense strategy determination" Journal on Communications, vol. 39, No. 10; Oct. 2018; 12 pages.
Yurjia, et al., "Mimic Security Defense Strategy Based on Software Diversity" Computer Science, vol. 45, No. 2, Feb. 2018; 7 pages.
The State Intellectual Property Office of People's Republic of China: First Office Action issued in CN Application No. 202010519102.X dated May 20, 2022; 11 pages including English translation.

* cited by examiner

INPUT/OUTPUT SYSTEM APPLIED TO NETWORK SECURITY DEFENSE SYSTEM

This application is a national phase entry under 35 U.S.C. § 371 of International Application No. PCT/CN2021/098596, filed Jun. 7, 2021, which designates the United States of America, which claims priority to Chinese Patent Application No. 202010519102.X, titled "INPUT/OUTPUT SYSTEM APPLIED TO NETWORK SECURITY DEFENSE SYSTEM", filed on Jun. 9, 2020 with the China National Intellectual Property Administration, the entire disclosures of each of these applications are hereby incorporated by reference in their entireties and for all purposes.

FIELD

The present disclosure relates to the field of electronic information, and in particular, to an input-output system applicable in a network security defense system.

BACKGROUND

Generally, various computers and devices for information and communication in a cyberspace information system may be regarded as expressions of Turing machine, which can receive, store and run a program that can be described by the Turing machine. An algorithm described in the program may be implemented by running the program. Therefore, the cyberspace information system may be abstracted as a reconfigurable channel having memory and processing capability. Security of cyberspace information systems is currently a hotspot for research.

SUMMARY

A network security defense system is proposed after research, as shown in FIG. 1. In the system shown in FIG. 1, a dynamically heterogeneous redundancy mechanism is adopted as one of security defense strategies. However, an input end and output end of the system have a characteristic of single-point communication, and the dynamically heterogeneous redundancy mechanism cannot be applied in the single-point communication. Therefore, how to improve security of the input end and output end of the system shown in FIG. 1 becomes a technical problem to be solved urgently.

An input-output system applicable in a network security defense system is provided in the present disclosure, in order to improve security of input-output for the network security defense system.

To achieve the objective, a technical solution is provided as follows.

An input-output system applicable in a network security defense system is provided, including a structural encoding unit and an error correction decoding unit.

The structural encoding unit includes an input branching module and an input proxy module. The input branching module is configured for message replication and distribution, and is verified as having no backdoor, and has a memory erasure function for erasing a memory of impact from generalized disturbance.

The error correction decoding unit includes an output selecting module, an output proxy module, an arbitration branching module, an arbitration proxy module and a voting module.

The arbitration branching module is configured to replicate and distribute data. The voting module is configured to vote. The output selecting module is configured to select, based on a voting result of the voting module, an output result from processing results of the output proxy module.

The output selecting module, the arbitration branching module and the voting module are verified as having no backdoor and have the memory erasure function.

At least the output proxy module and the arbitration proxy module are set up with a dynamically heterogeneous redundancy mechanism.

In an embodiment, any one of the input branching module, the output selecting module, the arbitration branching module and the voting module serves as a target module.

The target module includes a module configured with a redundancy and replacement mechanism, and/or a module configured with a non-random disturbance memory erasure mechanism.

The redundancy and replacement mechanism enable the target module to erase a memory of impact from random disturbance.

The non-random disturbance memory erasure mechanism comprises at least one of program curing, program tamper resistance, data initialization, and data tamper resistance.

In an embodiment, the program curing includes curing a program running in the target module, to prohibit changing a logic of the program, and/or curing, for a user, a program running in the target module, to prohibit the user from changing a logic of the program.

The program tamper resistance includes at least one of the following: comparing a program with a backup thereof, and replacing the program with the backup in response to logic difference between the program and the backup; restoring, periodically or non-periodically, the program through a preset restoration method in the program; verifying, in real time or non-real time, the program through a preset verification method; and correcting, in real time or non-real time, the program based on a preset code for encryption or error correction.

In an embodiment, the data initialization includes initializing a storage space for the data, and/or cleaning the storage space for the data.

The data tamper resistance includes at least one of the following: comparing the data with a backup thereof, and replacing the data with the backup in response to difference between the data and the backup; and verifying or correcting the data based on a code for verification, encryption or error correction preset in the data, and initializing the data in response to a verification result indicating a data change.

In an embodiment, the input branching module is configured to replicate a received user request message into multiple copies, and distribute the multiple copies of the user request message to the input proxy module.

The input proxy module is set up with a dynamically heterogeneous redundancy mechanism.

In an embodiment, the input proxy module is configured to receive a user request message, and transmit the user request message to the input branching module; and the input branching module is configured to replicate the user request message into multiple copies, and distribute the multiple copies of the user request message to service executors.

An input and output system applicable in a network security defense system is further provided, including a structural encoding unit and an error correction decoding unit.

The structural encoding unit includes an input branching module and an input proxy module, where the input branching module is configured for message replication and distribution, and is verified as having no backdoor, and has a memory erasure function for erasing a memory of impact from a generalized disturbance.

The error correction decoding unit includes a voting module, an output selecting module and an output proxy module.

The voting module is configured to vote. The output selecting module is configured to select, based on a voting result of the voting module, an output result from processing results of the output proxy module. The output selecting module and the voting module are verified as having no backdoor and have the memory erasure function.

In an embodiment, any one of the input branching module, the output selecting module, and the voting module serves as a target module.

The target module includes a module configured with a redundancy and replacement mechanism, and/or a module configured with a non-random disturbance memory erasure mechanism.

The redundancy and replacement mechanism enable the target module to erase a memory of impact from random disturbance.

The non-random disturbance memory erasure mechanism includes at least one of program curing, program tamper resistance, data initialization and data tamper resistance.

In an embodiment, the program curing includes curing a program running in the target module, to prohibit changing a logic of the program, and/or curing, for a user, a program running in the target module, to prohibit the user from changing a logic of the program.

The program tamper resistance comprises at least one of the following: comparing a program with a backup thereof, and replacing the program with the backup in response to logic difference between the program and the backup; restoring, periodically or non-periodically, the program through a preset restoration method in the program; verifying, in real time or non-real time, the program through a preset verification method; and correcting, in real time or non-real time, the program based on a preset code for encryption or error correction.

In an embodiment, the data initialization includes initializing a storage space for the data, and/or cleaning the storage space for the data.

The data tamper resistance comprises at least one of the following: comparing the data with a backup thereof, and replacing the data with the backup in response to difference between the data and the backup; and verifying or correcting the data based on a code for verification, encryption or error correction preset in the data, and initializing the data in response to a verification result indicating a data change.

In the input-output system applicable in a network security defense system provided in the present disclosure, a structural encoding unit is divided into an input branching module and an input proxy module, and an error correction decoding unit is divided into an output selecting module, an output proxy module, an arbitration branching module, an arbitration proxy module and a voting module. The input branching module is configured to replicate and distribute messages; the arbitration branching module is configured to replicate and distribute data; the voting module is configured to vote; and the output selecting module is configured to select, based on a voting result of the voting module, an output result from processing results of the output proxy module. As can be seen, the output selecting module, the arbitration branching module and the voting module each performs a single function, and therefore can be verified to be backdoor-free. In addition, the input branching module, the arbitration branching module, the voting module, and the output selecting module have a memory erasure function for erasing a memory of impact from generalized disturbance, and the input proxy module, the output proxy module, and the arbitration proxy module are set up with a dynamically heterogeneous redundancy mechanism to have a security defense feature. Therefore, the input end and the output end have high security.

BRIEF DESCRIPTION OF THE DRAWINGS

For clear illustration of technical solutions in embodiments of the present disclosure or the conventional technology, drawings used in the description of the embodiments or the conventional technology are described briefly hereinafter. Apparently, the drawings described in the following illustrate only some embodiments of the present disclosure, and other drawings may be obtained by those ordinarily skilled in the art based on these drawings without any creative effort.

DETAILED DESCRIPTION

Figure 1:
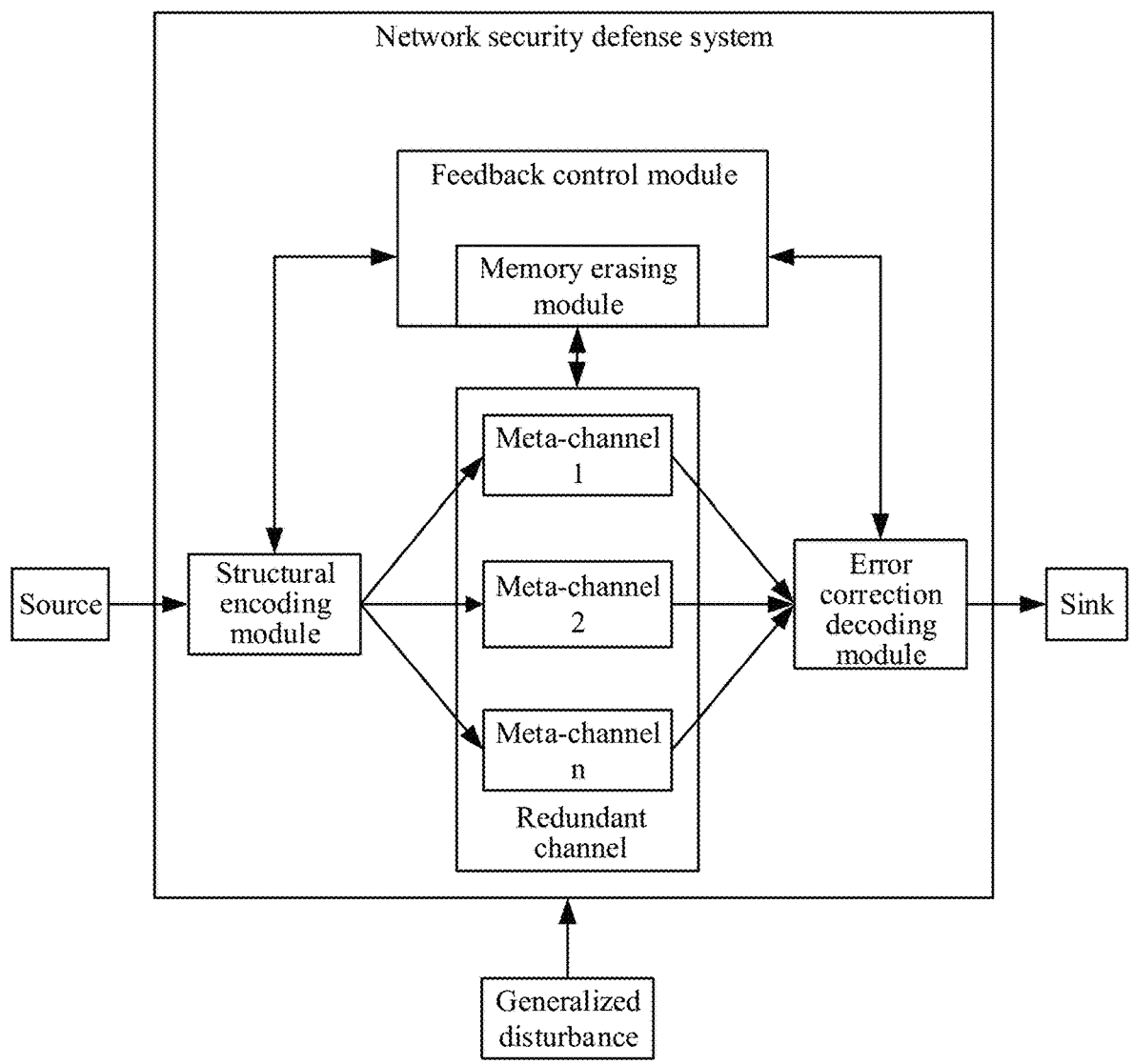
FIG. 1 is a schematic structural diagram of a security defense system.

FIG. 1 shows a security defense system proposed by the applicant. In the system, a dynamically heterogeneous redundancy mechanism is adopted to defend against backdoors and vulnerabilities caused by generalized disturbances. However, it is found that communication at an input end and an output end is single-point communication. For example, the input end is configured to receive, from a user, a request message which is usually sent only once by the user. Therefore, the input end and the output end are not suitable for the dynamically heterogeneous redundancy mechanism. Therefore, how to improve security of the input end and the output end is an urgent problem to be solved for the system shown in FIG. 1.

Regarding the problem, it is contemplated, from the perspective of backdoors and vulnerabilities caused by generalized disturbance, that the security may be improved as long as the backdoors and vulnerabilities are eliminated. Therefore, functions of the input end and the output end are classified into basic functions (with a characteristic of single-point communication) and complex functions. The basic functions are simple, and therefore formalized verification may be used to ensure no backdoors. In this case, security defense with regard to the basic functions is realized as long as vulnerabilities caused by generalized disturbance for the basic functions are eliminated, that is, as long as a memory of impact from the generalized disturbance can be erased.

The functions using single-point communication are classified as the basic functions, and complex functions are suitable for using the dynamically heterogeneous redundancy mechanism, thereby realizing security defense.

Based on the above-mentioned innovative principle, an input-output system applicable in a network security defense system is provided in the present disclosure, in order to improve security at an input end and an output end. It should be noted that although the input-output system in the present disclosure is designed with reference to the system shown in FIG. 1, it is not limited thereto. The input-output system in the present disclosure is applicable in any situation requiring security defense.

The technical solutions in the embodiments of the present disclosure are described clearly and completely in conjunction with the drawings of the embodiments of the disclosure hereinafter. It is apparent that the described embodiments are only some, rather than all, embodiments of the present disclosure. Any other embodiments obtained by those skilled in the art based on the embodiments in the present disclosure without any creative effort shall fall within the protection scope of the present disclosure.

Figure 2:
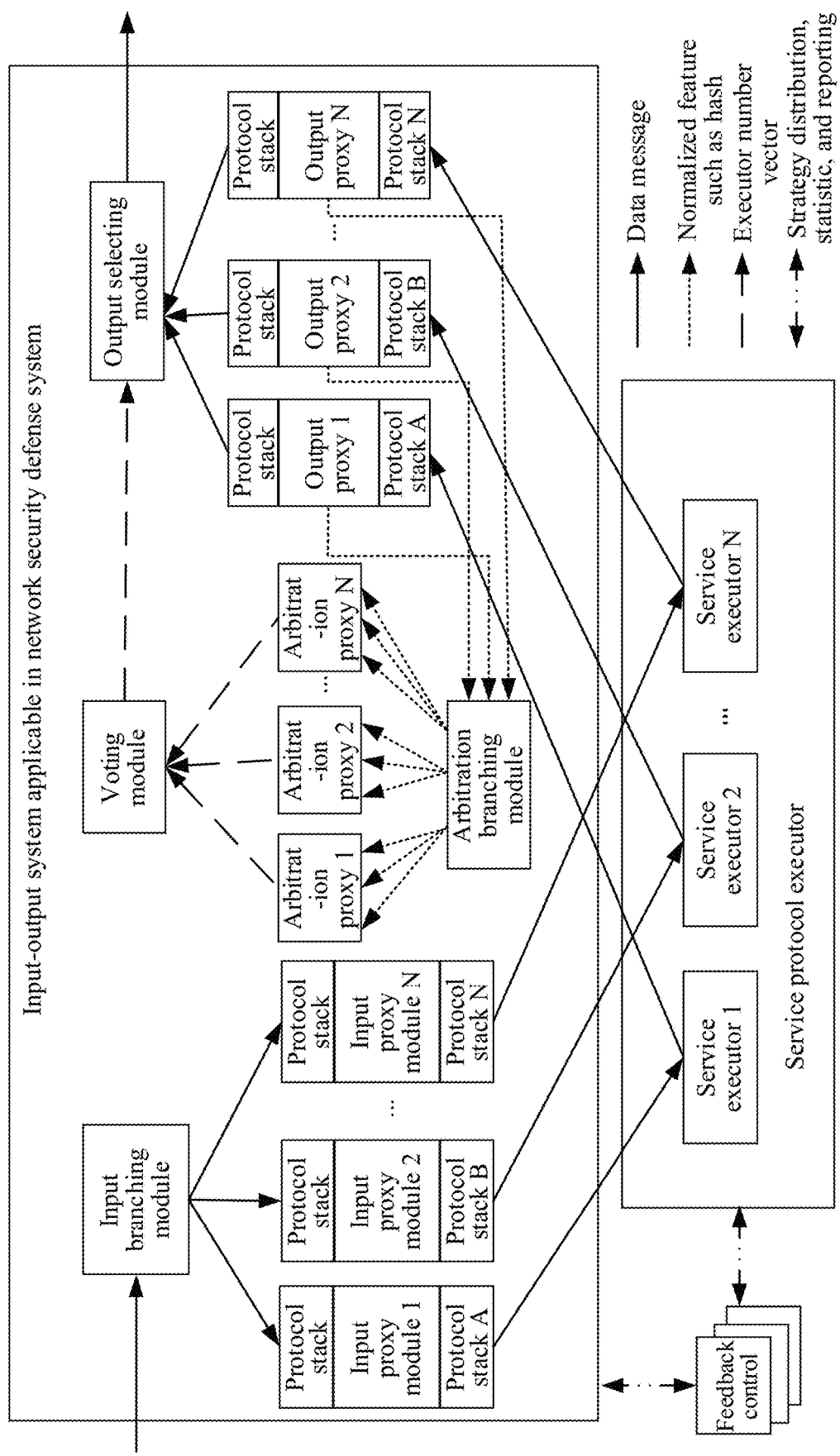
FIG. 2 is a schematic structural diagram of an input-output system applicable in a network security defense system according to an embodiment of the present disclosure.

FIG. 2 shows an input-output system applicable in a network security defense system according to an embodiment of the present disclosure. The input-output system includes a structural encoding unit and an error correction decoding unit.

The structural encoding unit is divided into an input branching module and input proxy modules. The error correction decoding unit is divided into an output selecting module, output proxy modules, an arbitration branching module, arbitration proxy modules and a voting module.

Based on the structural division, the structural encoding unit and the error correction decoding unit implement input-output function through the following process.

1. The input branching module is configured for message replication and distribution. The function may be implemented in a conventional manner.

In an example, the replication and distribution include: replicating a received user request message into multiple copies, and distributing the multiple copies of the user request message to the input proxy module. N input proxy modules are shown in FIG. 2 as an example.

2. The input proxy module is configured for terminating a user communication connection, initializing an executor connection, and adapting a user service request message (eliminate a fingerprint, performing a random transformation, and the like). In an example, the input proxy module functions to transmit a received user request message to a service executor. The function may be implemented in a conventional manner.

3. The output proxy module is configured for terminating a user communication connection, initializing an executor connection, and adapting a user service request message (eliminate a fingerprint, performing a random transformation, and the like).

In an example, the output proxy module functions to receive an executor response message outputted from the service executor in response to the user request message, and output a normalized feature value (such as a hash value) to adapt to an executor service response.

The function may be implemented in a conventional manner.

4. The arbitration branching module is configured to replicate and distribute data. For example, the arbitration branching module is configured to replicate the normalized feature value at an output end of the output proxy module into multiple copies and distribute the copies to the arbitration proxy module. The function may be implemented in a conventional manner.

5. The arbitration proxy module is configured to perform arbitration on inputted data according to a preset arbitration algorithm, and output an arbitration result. For example, the arbitration proxy module is configured to perform arbitration on N normalized feature values, and output an arbitration result including an executor number vector. The function may be implemented in a conventional manner.

6. The voting module is configured for voting. For example, the voting module is configured to perform majority selection bit by bit on the inputted N executor body number vectors, and output one executor number vector in which each bit indicates a majority among values for this bit of the N executor body number vectors. The function may be implemented in a conventional manner.

7. The output selecting module is configured to select one from multiple output proxy modules to output a response. For example, the output selecting module is configured to randomly select, based on the executor number vector indicated by a voting result, one output-adapted executor to response to the message. The function may be implemented in a conventional manner.

It can be seen from the above process that the output selecting module, the arbitration branching module and the voting module are configured to perform basic functions, and therefore formalized verification (that is, all functions are verified exhaustively in a design stage to ensure that the functions are all safe in use) may be used to ensure no backdoors.

Therefore, as long as the memory of impact from generalized disturbance is erased from the output selecting module, the arbitration branching module and the voting module, the security requirement of the basic functions is satisfied.

Any one of the input branching module, the output branching module, the arbitration branching module and the voting module is referred to as a target module, and the target module may erase the memory in the following manners.

Case 1: the target module is configured with a redundancy and replacement mechanism.

The redundancy and replacement mechanism means using redundant (for example, multiple) hardware and/or software, and replacing the hardware and/or software whose reliability is reduced by another hardware and/or software, so as to improve reliability.

For example, the input voting module in an embodiment includes multiple voting devices. As a physical device, the voting device is not affected by non-random disturbance, but its reliability may be reduced due to a limited lifetime. Therefore, two voting devices are used, one being currently used and the other being a redundant backup to be activated in a situation where the currently used voting device fails due to reduced reliability.

In a case where the target module is a physical device (i.e., hardware), proxy modules (including the input proxy module, the output proxy module, and the arbitration proxy module) are also hardware (for example, including a processor and a memory), having programs running thereon to perform functions of the proxy modules.

Case 2: the target module is configured with a non-random disturbance memory erasure mechanism.

The non-random disturbance memory erasure mechanism includes at least one of program curing, program tamper resistance, data initialization and data tamper resistance.

In an embodiment, the program curing includes: curing a program running in the target module, to prohibit changing a logic of the program, and/or curing, for a user, a program running in the target module, to prohibit the user from changing the logic of the program. The program may be cured in a conventional way.

The program tamper resistance includes at least one of the following:

(1) comparing a program with a backup thereof, and replacing the program with the backup in response to logic difference between the program and the backup;

(2) restoring, periodically or non-periodically, the program through a preset restoration method in the program;

(3) verifying, in real time or non-real time, the program through a preset verification method; and (4) correcting, in real time or non-real time, the program based on a preset code for encryption or error correction.

A method for the data initialization includes initializing a storage space for the data, and/or cleaning the storage space for the data.

The data tamper resistance includes at least one of the following:

(1) comparing the data with a backup thereof, and replacing the data with the backup in response to difference between the data and the backup; and (2) verifying or correcting the data based on a code for verification, encryption or error correction preset in the data, and initializing the data in response to a verification result indicating a data change.

The specific implementations of the non-random disturbance memory erasure mechanism may be realized with software and/or hardware.

Based on the target module, the modules configured to perform basic functions in the embodiments have security defense function.

In addition, the input proxy module, the output proxy module, and the arbitration proxy module in FIG. 2 are set up with the dynamically heterogeneous redundancy mechanism to have security defense function. A specific implementation of the dynamically heterogeneous redundancy mechanism is not within the scope of the present disclosure, and is not detailed here.

In an embodiment, for purpose of management, the redundant proxy modules in FIG. 2, the input proxy module and the output proxy module may correspond to service executors in a one-to-one relationship. The input proxy module, the output proxy module, and the service executor that have a same number may be grouped into a same group, and may simultaneously subject to cleaning or scheduling in the unit of group based on an arbitration result.

In an embodiment, the system in FIG. 2 may further include a protocol stack for storing preset protocols. Specifically, the protocol stack may include an internal-facing protocol stack and an external-facing protocol stack. For simple implementation and eliminating synchronization in the internal-facing protocol stack, the input proxy module and the output proxy module with a same number may be implemented by a same software and hardware functional unit. The external-facing protocol stack is configured to ensure normal communication between each proxy module and the outside, that is, a state of the external-facing protocol stack of the input proxy module and a state of the external-facing protocol stack of the output proxy module are kept consistent with each other.

Further, in a case where a newly developed automatic state machine is adopted, a state consistency may be achieved without a synchronization mechanism. In a case where an existing protocol stack that cannot be modified is adopted, a synchronization mechanism needs to be added to keep consistency of connection states among the protocol stacks. Processing is similar for cases of only accepting connections and initiating outward-connections. The method shown in FIG. 2 may be applied directly for cases of only accepting connections. For case of initiating a connection, a step in which the input end or the output end initiates a connection request may be added, and the subsequent processing is exactly the same as the above.

In an embodiment, as shown in FIG. 2, the input-output system applicable in a network security defense system may also perform data interaction with a feedback control module, so as to exchange strategies, that is, the feedback control module may distribute a strategy such as an input proxy strategy to modules in the input-output system, and receive a strategy reported from the modules. Moreover, the feedback control module may exchange strategies with a service executor.

In the input-output system applicable in a network security defense system as shown in FIG. 2, functions of the input end and the output end are classified into basic functions and complex functions, where the basic functions realize single-point communication; and separate security defense mechanisms are configured for the basic functions and the complex functions, realizing improved security of the input end and the output end with the premise of ensuring the single-point communication at the input end and the output end.

Figure 3:
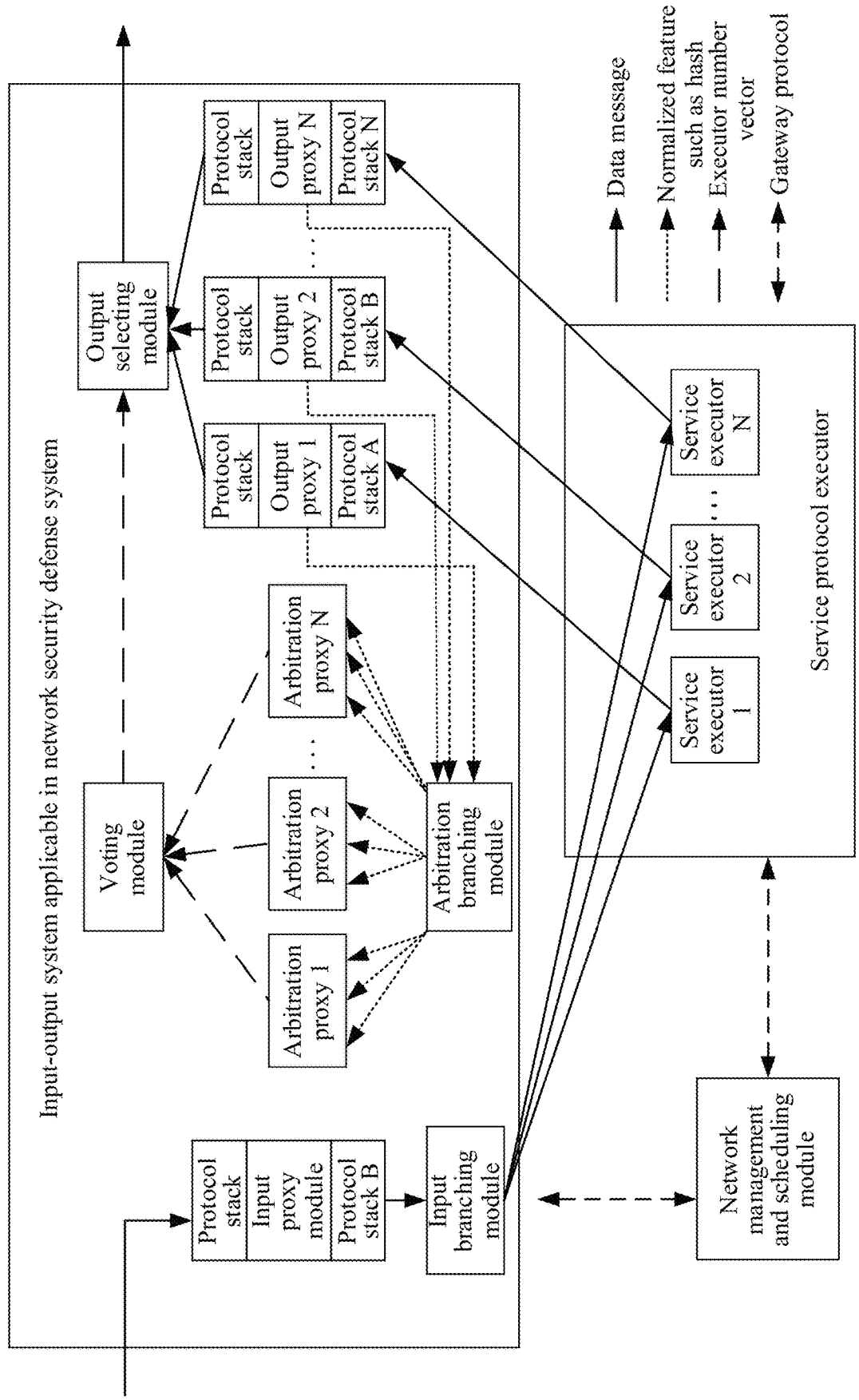
FIG. 3 is a schematic structural diagram of an input-output system applicable in a network security defense system according to another embodiment of the present disclosure.
Figure 4:
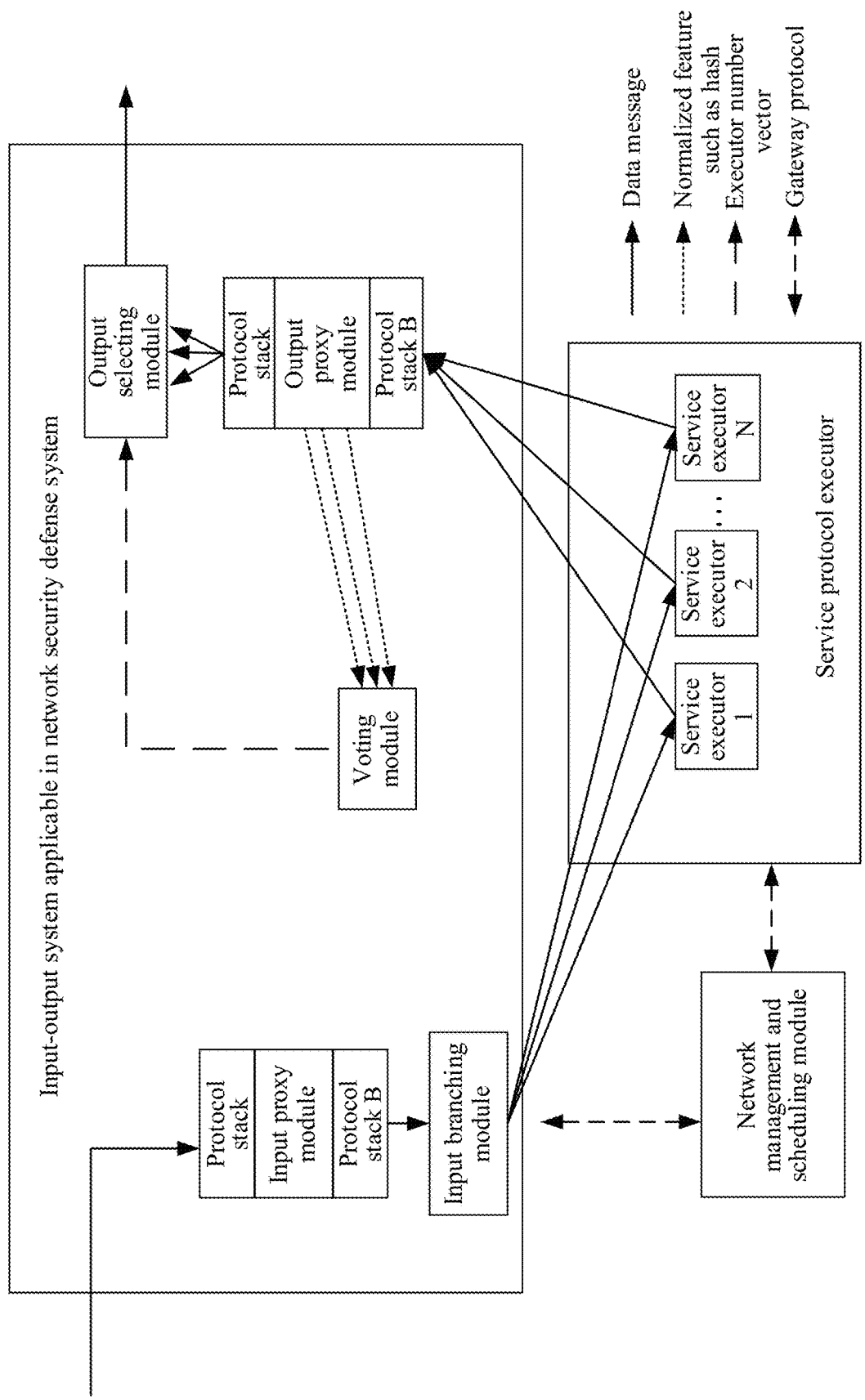
FIG. 4 is a schematic structural diagram of an input-output system applicable in a network security defense system according to yet another embodiment of the present disclosure.

It may be understood that, in order to reduce difficulty and cost of implementation, the input-output system applicable in a network security defense system shown in FIG. 2 may be appropriately simplified, and FIG. 3 and FIG. 4 each shows a simplified system.

FIG. 3 shows an input-output system applicable in a network security defense system according to another embodiment of the present disclosure. The input-output system differs from that of FIG. 2 in that: only one input proxy module is included, and the dynamically heterogeneous redundancy mechanism is not adopted. The input proxy module is configured to receive a user request message and transmit the user request message to the input branching module. The input branching module is configured to replicate the user request message into multiple copies, and distribute the multiple copies of the user request message to the service executors.

Functions and implementations of the other modules in FIG. 3 may be referred to FIG. 2, and are not repeated herein.

In practice, a service executor may be connected to the input-output system applicable in a network security defense system via a network management and scheduling module (which may be regarded as an implementation of the feedback control module). In FIG. 3, the function of modules shown in the solid line box may be realized by modifying existing software. Modules shown in the dotted box may be implemented by modifying existing hardware and/or software. Modifications may be made by those skilled in the art based on the above description of functions, which are not detailed herein.

Compared with FIG. 2, the input proxy module in the system shown in FIG. 3 is simplified, and therefore the cost is reduced while satisfying a need for security defense. Therefore, a balance between security and cost is achieved.

FIG. 4 shows an input-output system applicable in a network security defense system according to another embodiment of the present disclosure, including a structural encoding unit and an error correction decoding unit.

The structural encoding unit is divided into an input branching module and an input proxy module. There is only one input proxy module and the dynamically heterogeneous redundancy mechanism is not adopted. The input proxy module is configured to receive a user request message and transmit the user request message to the input branching module. The input branching module is configured to replicate the user request message into multiple copies, and distribute the multiple copies of the user request message to service executors.

The error correction decoding unit is divided into a voting module, an output selecting module and an output proxy module. There is only one output proxy module and the dynamically heterogeneous redundancy mechanism is not adopted. The voting module is configured to vote on an output result of the proxy module. A function of the output selecting module is the same as what described in the previous embodiment.

In the system shown in FIG. 4, the dynamically heterogeneous redundancy mechanism is not adopted for the complex functions of the input end and the output end, but the basic functions may still be verified as having no backdoor and have the memory erasure function. Therefore, only the input proxy module and the output proxy module need to be designed with a security defense mechanism, which, compared with the input end and the output end without division of basic functions and complex functions in the conventional technology, provides an easier way to realize security defense, and has low difficulty and cost of implementation due a simple structure.

In a case where the function described in the method of the embodiments of the present disclosure is implemented in a form of software functional unit and sold or used as an independent product, the function may be stored in a readable storage medium of a computing device. Based on this understanding, a part of the embodiments in the present disclosure that contributes to the conventional technology or a part of the technical solution may be embodied in a form of a software product stored in a storage medium and including several instructions to instruct a computing device (which may be a personal computer, a server, a mobile computing device, a network device, or the like) to perform all or part of the steps of the method described in the embodiments of the present disclosure. The storage medium includes various media that can store program codes, for example, USB disk, mobile hard disk drive, Read-Only Memory (ROM), Random Access Memory (RAM), magnetic disk, optical disk and the like.

The embodiments in this specification are described in a progressive manner, each of the embodiments emphasizes the differences between the embodiment and other embodiments, and the same or similar parts among the embodiments may be referred to each other. The description of the embodiments herein enables those skilled in the art to implement or use the present disclosure. Many modifications to these embodiments are apparent for those skilled in the art. The general principles defined herein may be applicable in other embodiments without departing from the spirit or scope of the present disclosure. Therefore, the present disclosure is not limited to the embodiments illustrated herein, but is to conform to the widest scope consistent with the principles and novel features disclosed herein.

The invention claimed is:

1. An input-output system applicable in a network security defense system, the input-output system comprising a structural encoding unit and an error correction decoding unit, wherein:

the structural encoding unit comprises an input branching processor and an input proxy processor, wherein the input branching processor is configured for message replication and distribution, the input branching processor is verified as having no backdoor, and is configured for erasing a memory of generalized disturbance;

the error correction decoding unit comprises an output selecting processor, an output proxy processor, an arbitration branching processor, an arbitration proxy processor and a voting processor, wherein:
  the arbitration branching processor is configured to replicate and distribute data,
  the voting processor is configured to vote,
  the output selecting processor is configured to select, based on a voting result of the voting processor, an output result from processing results of the output proxy processor,
  the output selecting processor, the arbitration branching processor and the voting processor are verified as having no backdoor and have the memory erasure function, and
  at least the output proxy processor and the arbitration proxy processor are set up with a dynamically heterogeneous redundancy mechanism, wherein any one of the input branching processor, the output selecting processor, the arbitration branching processor, and the voting processor serves as a target processor, the target processor is configured with a non-random disturbance memory erasure mechanism, wherein the target processor is further configured with a redundancy and replacement mechanism, wherein the redundancy and replacement mechanism enable the target processor to erase a memory of random disturbance; and the non-random disturbance memory erasure mechanism comprises at least one of program curing, program tamper resistance, data initialization, and data tamper resistance.

2. The system according to claim 1, wherein the program curing comprises curing a program running in the target processor to prohibit changing a logic of the program, or curing, for a user, a program running in the target processor, to prohibit the user from changing a logic of the program; and the program tamper resistance comprises at least one of the following:
  comparing a program with a backup thereof, and replacing the program with the backup in response to logic difference between the program and the backup;
  restoring, periodically or non-periodically, the program through a preset restoration method in the program;
  verifying, in real time or non-real time, the program through a preset verification method; and
  correcting, in real time or non-real time, the program based on a preset code for encryption or error correction.

3. The system according to claim 1, wherein the data initialization comprises initializing a storage space for data, or cleaning the storage space for the data; and the data tamper resistance comprises at least one of the following:
  comparing the data with a backup thereof, and replacing the data with the backup in response to difference between the data and the backup; and verifying or correcting the data based on a code for verification, encryption, or error correction preset in the data, and initializing the data in response to a verification result indicating a data change.

4. The system according to claim 1, wherein
the input branching processor is configured to replicate a received user request message into a plurality of copies, and distribute the plurality of copies of the user request message to the input proxy processor; and
the input proxy processor is set up with the dynamically heterogeneous redundancy mechanism.

5. The system according to claim 1, wherein
the input proxy processor is configured to receive a user request message, and transmit the user request message to the input branching processor; and
the input branching processor is configured to replicate the user request message into a plurality of copies, and distribute the plurality of copies of the user request message to service executors.

6. An input-output system applicable in a network security defense system, the input-output system comprising a structural encoding unit and an error correction decoding unit, wherein:
the structural encoding unit comprises an input branching processor and an input proxy processor, wherein the input branching processor is configured for message replication and distribution, the input branching processor is verified as having no backdoor, and is configured for erasing a memory of generalized disturbance; and
the error correction decoding unit comprises a voting processor, an output selecting processor and an output proxy processor, wherein
the voting processor is configured to vote,
the output selecting processor is configured to select, based on a voting result of the voting processor, an output result from processing results of the output proxy processor, and
the output selecting processor and the voting processor are verified as having no backdoor and have the memory erasure function,
wherein any one of the input branching processor, the output selecting processor, and the voting processor serves as a target processor,
the target processor is configured with a non-random disturbance memory erasure mechanism,
the target processor is further configured with a redundancy and replacement mechanism, wherein
the redundancy and replacement mechanism enable the target processor to erase a memory of random disturbance; and
the non-random disturbance memory erasure mechanism comprises at least one of program curing, program tamper resistance, data initialization, and data tamper resistance.

7. The system according to claim 6, wherein
the program curing comprises curing a program running in the target processor to prohibit changing a logic of the program, or curing, for a user, a program running in the target processor, to prohibit the user from changing a logic of the program; and
the program tamper resistance comprises at least one of the following:
comparing a program with a backup thereof, and replacing the program with the backup in response to logic difference between the program and the backup;
restoring, periodically or non-periodically, the program through a preset restoration method in the program;
verifying, in real time or non-real time, the program through a preset verification method; and
correcting, in real time or non-real time, the program based on a preset code for encryption or error correction.

8. The system according to claim 6, wherein
the data initialization comprises initializing a storage space for data, or cleaning the storage space for the data; and
the data tamper resistance comprises at least one of the following:
comparing the data with a backup thereof, and replacing the data with the backup in response to difference between the data and the backup; and
verifying or correcting the data based on a code for verification, encryption, or error correction preset in the data, and initializing the data in response to a verification result indicating a data change.

* * * * *